June 24, 1941. J. M. VETTER Re. 21,844

AUTOMATIC CHANGE SPEED GEAR MECHANISM

Original Filed Nov. 9, 1932 4 Sheets-Sheet 1

Inventor

Johan Machiel Vetter

By Daniel C. Wilkerson

Attorneys

June 24, 1941. J. M. VETTER Re. 21,844

AUTOMATIC CHANGE SPEED GEAR MECHANISM

Original Filed Nov. 9, 1932 4 Sheets-Sheet 2

Inventor

Johan Machiel Vetter

By Daniel C. Wilkerson

Attorneys

June 24, 1941. J. M. VETTER Re. 21,844

AUTOMATIC CHANGE SPEED GEAR MECHANISM

Original Filed Nov. 9, 1932 4 Sheets-Sheet 3

Inventor
Johan Machiel Vetter
By Daniel C. Wilkerson
Attorneys

June 24, 1941. J. M. VETTER Re. 21,844

AUTOMATIC CHANGE SPEED GEAR MECHANISM

Original Filed Nov. 9, 1932 4 Sheets-Sheet 4

Inventor

Johan Machiel Vetter

By Daniel C. Wilkerson

Attorneys

Reissued June 24, 1941

Re. 21,844

UNITED STATES PATENT OFFICE 21,844

AUTOMATIC CHANGE SPEED GEAR MECHANISM

Johan Machiel Vetter, The Hague, Netherlands, assignor, by mesne assignments, to General Motors Corporation, Detroit, Mich., a corporation of Delaware Original No. 1,984,556, dated December 18, 1934, Serial No. 641,877, November 9, 1932. Application for reissue December 18, 1936, Serial No. 116,653. In the Netherlands November 11, 1931

55 Claims. (Cl. 74—472)

The invention relates to an automatic change speed gear mechanism operating between a driving and a driven shaft, and is more particularly adapted for motor vehicles of the type wherein the geared drive is automatically shifted by means of a regulating mechanism cooperating with a fluid pressure shifting mechanism.

The device according to the invention is of special interest for motor vehicles, but it can also be adapted to other devices in which the transmission ratio between driving shaft and driven shaft must be altered according to circumstances of load, in other words, in which a gradual acceleration of the driven shaft which carries the load has to be effected.

While by hand operated change speed gear mechanisms the acceleration of the driven shaft can only be carried out in a fashion lacking all graduality or evenness, that is to say shock-like, this undesirable condition is completely removed by the fully automatic device according to the invention. The engine driver only has to bring the device into operative condition by carrying out a simple manual operation, for instance to turn an electric switch, and then the device will automatically transfer the drive torque successively in such a way that an absolutely gradual acceleration of the driven shaft is obtained.

Moreover the successive shifting of the driving torque is carried out in such close succession, with such evenness and without any shock, that during the automatic acceleration from lowest to highest gear, there is never a period in which the driven shaft keeps revolving for some time at the number of revolutions corresponding to the maximum rotational speed obtained with the gear last brought into operation. It is to be understood that during the total acceleration period from lowest gear to direct drive, there need be no change in the number of revolutions per minute of the driving shaft or in the power provided per revolution of said shaft. This implies in the case of the driving shaft, being the shaft of a combustion engine, that the fuel admission to said engine may remain unaltered during the acceleration period of the driven shaft.

When under these circumstances the driven shaft, braked by the load it is carrying, is brought from a standstill to the highest obtainable rotational speed corresponding with the first gear, the second gear in close succession begins to accelerate the driven shaft, at the same time the first speed drive is gradually shifted out of operation, and so on.

In this way a sudden and shock-like acceleration is prevented. Only when the maximum rotational speed of the driven shaft, corresponding to the highest gear, that is, according to the direct drive or the over-speed gear, has been obtained under these circumstances of constant fuel admission, for example, to the power supplying internal combustion engine, said fuel admission may be increased, and from then on the rotational speed is regulated by means of the amount of fuel admitted to the cylinders of the combustion engine.

According to the above, two phases in the degree of fuel admission have to be observed: (*a*) Constant fuel admission before the highest gear (direct drive or overspeed gear) has been put into operation. (*b*) Variable fuel admission after the maximum rotational speed with the highest gear has been obtained. This form of operating regime is not, however, limited to the constant throttle type of operation, as will be seen from the following description.

In the following these two phases in the degree of fuel admission will be shortly denominated (*a*) constant gas, (*b*) variable gas.

The amount of constant gas depends on the desired initial rotational speed of the driven shaft, the initial speed being the maximum speed of the driven shaft obtainable in the highest gear with constant fuel admission.

The initial speed can be fixed at any desired number of revolutions per minute of the driven shaft, corresponding to any speed on the road of the car. For instance the initial speed may be fixed at five miles an hour, or it may be required that within a certain number of seconds after starting a road speed of seventy miles is obtained, said number of seconds being required for gradually accelerating from a standstill to initial road speed by means of the different gears. These functions may be predetermined for various engine powers, vehicle loads and driving conditions to be encountered, and incorporated in the commercial design to meet the operating requirements.

The present invention is characterized by the following features.

The automatic change speed gear mechanism is coupled with the driven shaft.

According to the invention, a fan is coupled with the driven shaft, by means of which fan a difference of pressure (vacuum or an overpressure) is generated, the amount of which corresponds with the number of revolutions per minute of said driven shaft. A pneumatic servo-motor is provided, which, operating under the influence of the difference of pressure and corresponding to the amount thereof, causes an electric switch to occupy successive positions according to which the current provided by an electric power supply is successively directed to coils, which command the air distributing valves of servo-motors which operate the shifting rods of the different gears. While it is preferred to utilize fluid pressure means for simplicity of interlinkage with the elements conditioned by speed and other factors, it is of course obvious that other known control motor means may be used.

According to the invention the transmission ratio for the gear wheels of the different gears is such that during the course of the successive operation of said gears the driven shaft is submitted to a gradual acceleration.

According to the invention the operation of each of the gears is obtained by shifting a smoothly operating coupling clutch into operative position, while the gear wheels of the gears are constantly meshing.

According to the invention the shifting rod of each of the gears is connected with a spring-actuated piston rod, on which two pistons are mounted, which operate in two separate cylinders, said piston rods serving for operating said shifting rods.

According to the invention the shifting mechanism for the smoothly operating coupling clutches is constructed in such a way that the clutch belonging to the gear which is to be made inoperative is only shifted completely out of its operative position after the clutch belonging to the gear which is to be made operative has already been shifted in its operative position in such a way that for a short time both clutches are in operative position.

A further characteristic feature of the invention consists therein that in order to obtain a smooth operation of the shifting rods of the gears the inlet valves of the foremost of the two pneumatic cylinders actuating said rods are constructed with a greater overlap than those of the other cylinder.

Finally the device according to the invention is characterized by the fact that in the conduit which connects the fan coupled with the driven shaft, with the pneumatic device for actuating the electric switch, a throttle is arranged which is coupled with the gas fuel admission handle, pedal or similar device.

In the drawings a form of execution of the device according to the invention is illustrated.

Figure 4:
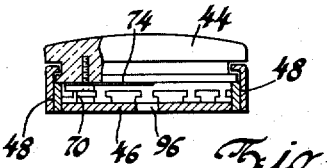
Fig. 4 is a cross section through the hand operated switch mounted on the steering wheel.
Figure 4A:
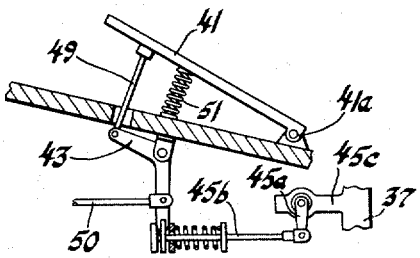

Fig. 4*a* shows a conventional accelerator pedal connected to the bleed valve 45*a*.

Figure 5:
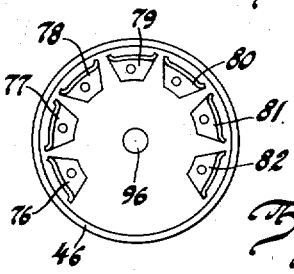

Fig. 5 is a view of this switch, with the cover removed.

Figure 6:
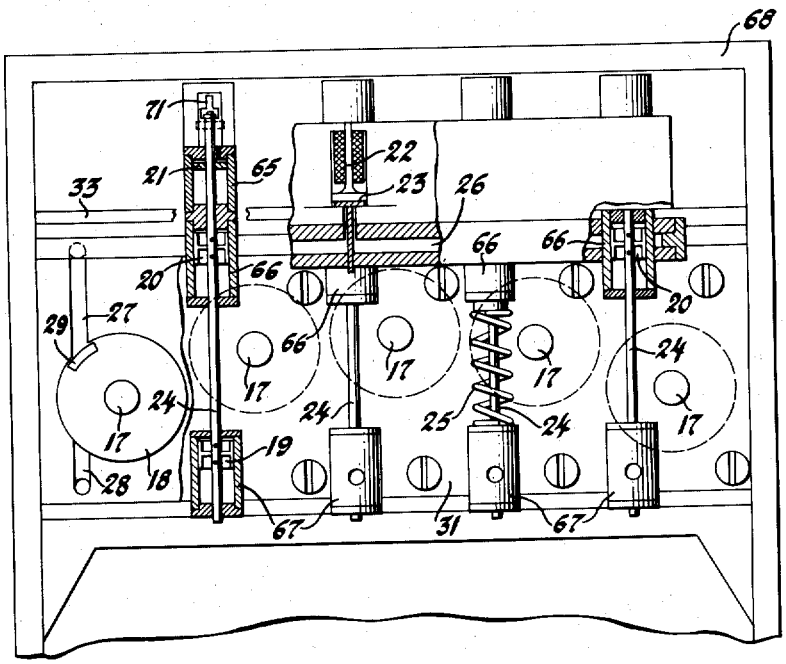

Fig. 6 is a front view partly in section of the pneumatic actuating mechanism for the gear shifting rods.

Figure 7:
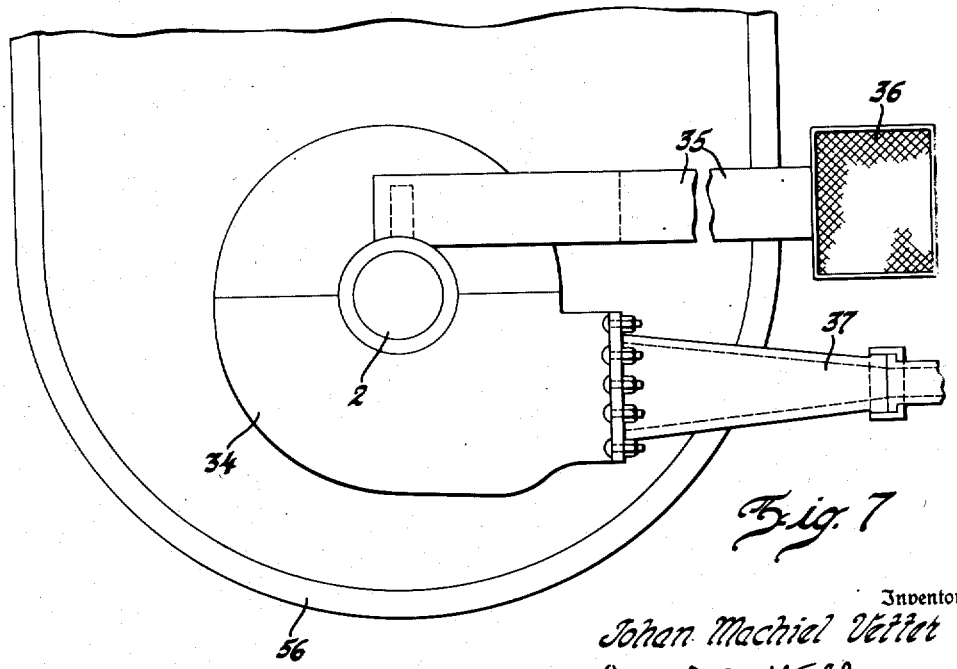

Fig. 7 is a view of the fan.

Figure 9:
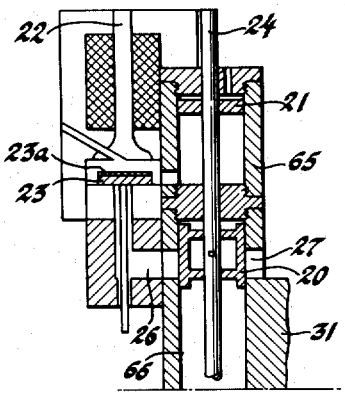
Figure 8:
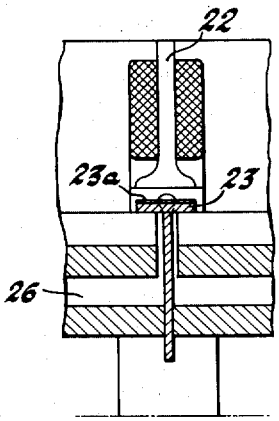
Figure 10:
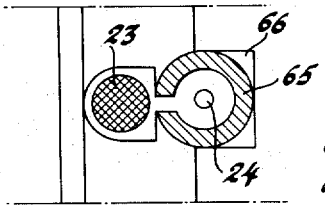

Figs. 8, 9 and 10 are details of the electric relay.

Figure 11:
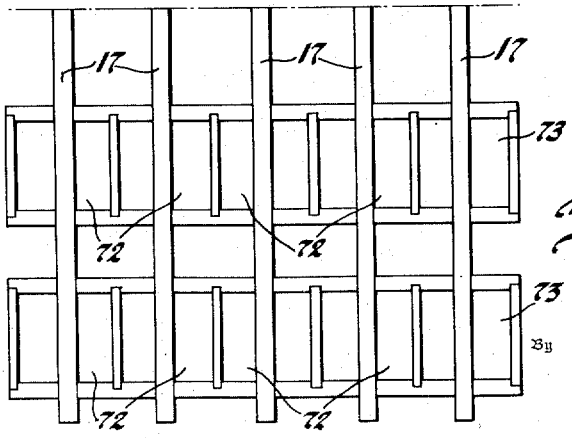

Fig. 11 shows the arrangement of the cylinders of the pneumatic device in a front view.

Figure 12:
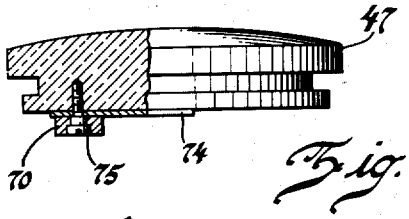

Fig. 12 shows the cover of the hand operated switch 47 with the small copper plate 74 and the contact roller 70 which turns on the spindle 75.

Figure 13:
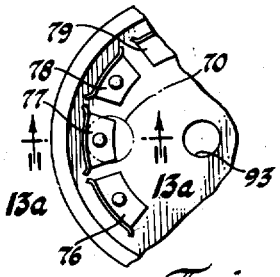

Figure 13 shows how the contact springs are bent and the way in which the contact roller 70 cooperates with the springs.

Figure 13A:
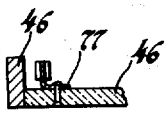

Figure 13*a* is a cross section along the line 13*a*—13*a* of Figure 13.

Figure 14:
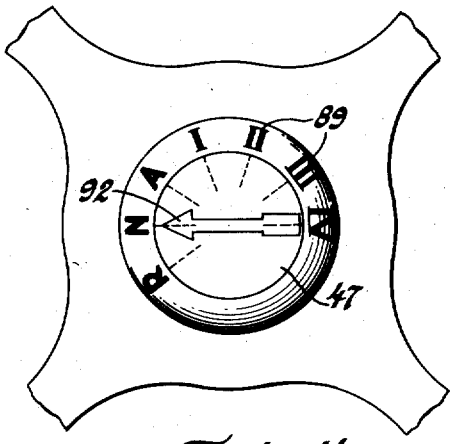

Figure 14 shows the arrow and the inscriptions on the cover of the hand operated switch box, respectively for reverse, neutral, automatic and hand operated gears: I, II, III, IV.

Figure 15:
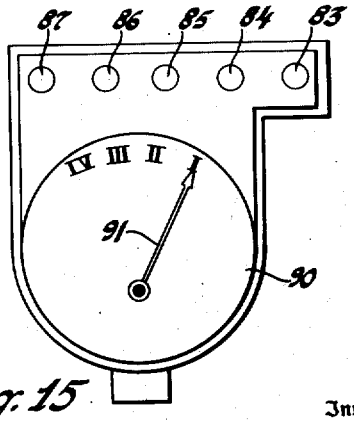

Figure 15 shows the visual signs and the dial of the manometer.

Figure 16:
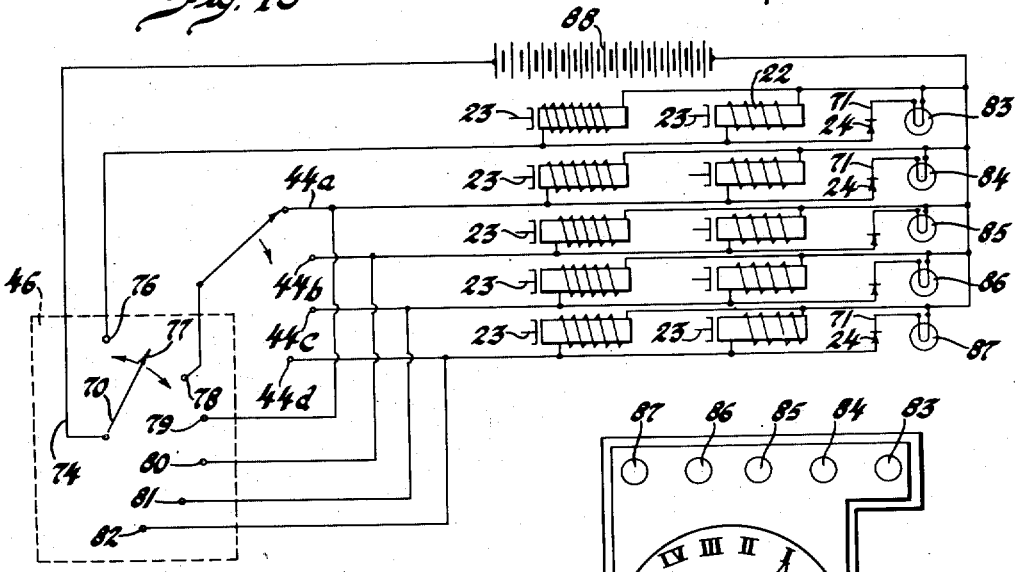

Figure 16 shows the wiring-diagram.

The gear wheels of the transmission mechanism are constantly meshing. The gear wheels mounted to rotate on the driving shaft 1 can be connected with said shaft. The gear wheels mounted on the countershaft are fixed to said shaft. The gear wheels on the driving shaft 1 can be connected with said shaft by means of smoothly operating coupling clutches.

Figures 1, 2:
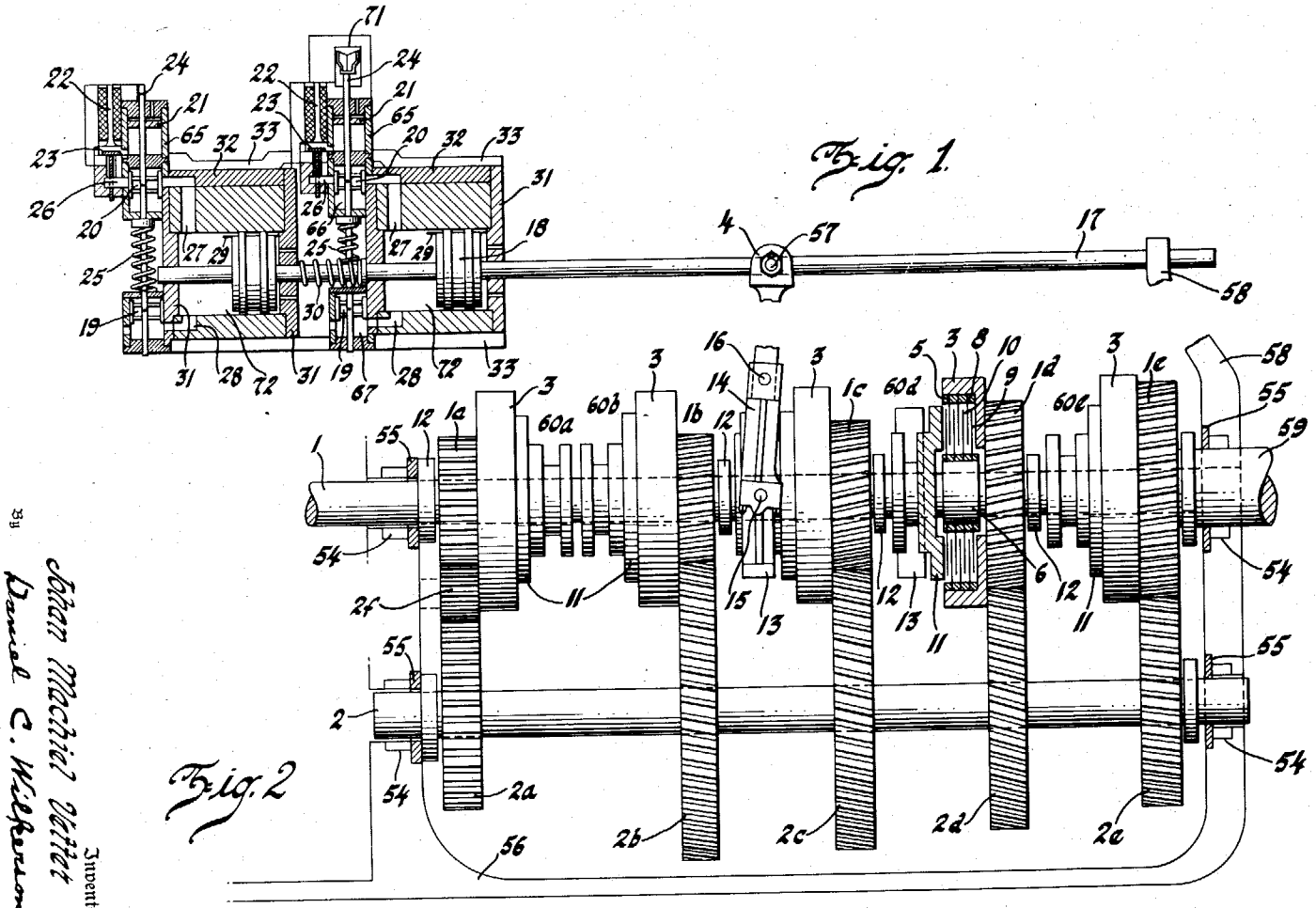
Fig. 1 is a longitudinal section through the pneumatic device used as an example for actuating the gear shifting rods.
Fig. 2 is a view partly in section of one embodiment of the gear mechanism in which three shafts are employed.

Inside the casing 56 are arranged the driving or motor shaft 1, and the countershaft 2 for the transmission of the torque to the Cardan or output shaft 59. (Fig. 2).

On the driving shaft 1 the gear wheels 1*a* for the reverse, 1*b* for the first gear, 1*c* for the second gear, and 1*d* for the third gear and are rotatably mounted. Said gear wheels are constantly meshing with the gear wheels fixed to the counter shaft, with which they cooperate.

The gear wheels 2*a*, 2*b*, 2*c*, 2*d* mesh with the above gears as shown. Gear 2*f* is a reverse idler between gears 1*a* and 2*a*, and gear 2*e* fixed to countershaft 2 meshes with gear 1*e*.

The wheel 1*e* is fixed to the Cardan shaft 59, in which the end of the driving shaft is piloted. When the motor operates and the motor clutch is shifted into operative position, the driving shaft 1 can rotate freely inside of the gear wheels. The fourth speed is a direct drive in which the gear pair 2*e* and 1*e* is not operative.

In order to connect the gear wheels with the driving shaft, they are coupled with said shaft by means of clutches of the disc type, comprising multiple discs.

At the back of each of the gear wheels rings 12 are mounted, which serve for keeping the gear wheels in their proper places against axial motion and also for having the gear wheels pressed tightly against them.

In consequence of the inclined position of the teeth on the gear wheels, the driving gear wheel when performing its driving duty, will be pressed tightly against the clutch, while when running idle just the reverse will happen, because said gear wheel will then be driven itself by the secondary gear wheel.

Each of the clutches comprises a large drum 3 provided with slots 5, large discs 8, a small drum 6 with splines 7, and the small discs 9, and friction discs 10 between the discs 8 and 9.

The small drum 6 is fixed to the driving shaft 1. The large drum 3 is connected with the gear wheel 1d. The presser plate 11, which serves for compressing the disc clutch, is shiftably mounted on the shaft 1. The ring 13 is in two pieces which are connected by bolts, and with said ring the presser plate 11 is pressed against the clutch.

By means of the forked levers 14 (one of which has been illustrated in the drawings), which are pivotally mounted in pivots 16, the change speed gear mechanism (Fig. 2) is connected with the pneumatic device (Fig. 1). For carrying out the coupling operation, the fork 4 which is connected at 57 with the piston rod 17 is pulled to the left by said rod 17. In consequence thereof the lower arm of the lever 14, together with the ring 13 and the presser plate 11 are shifted to the right and cause the clutch to operate.

The pneumatic device is illustrated in Fig. 1. The pistons 18 of this device are actuated under the influence of a difference in pressure, and by means of an electric regulating device they can be put in or out of operation. For the actuation of the pistons vacuum is used. The device comprises the following parts.

Two cylinder castings are provided, each containing four cylinders 72 for the forward gears and one cylinder 73 for the reverse gear (Fig. 11). The cylinders are arranged in such a way that always two cylinders in line cooperate (Fig. 11). The piston rod 17 for one gear is common for both cylinders. Inside the cylinders work the pistons 18 with their piston rings 29. In the walls of the cylinders are arranged the suction canals 27 and the canals 28 for the connection with the atmosphere. In the cover plates 32 said canals 27 are arranged horizontally.

The front and back covers 31 close the cylinder. The springs 30 between the cylinder blocks serve for pushing the pistons back into the position corresponding with the position of the clutch when it is out of operation.

At the end of the stroke of the piston the ring 29 is pushed against the admission opening of the canal 27 under the influence of the vacuum in the canal 27. In consequence of this circumstance the shock which the mechanism would otherwise receive is now smoothed off, because the suction opening becomes gradually smaller. This cushioning action is important to the smoothness of the shift.

The mechanism for actuating the reverse gear is in opposite position to that for the ahead gears.

The reverse coupling clutch on the driving shaft is shifted to the left instead of to the right and in consequence thereof the pistons belonging to said mechanism must be also shifted in opposite direction, that is to the right instead of to the left. Therefore the canals 27 are positioned at the opposite ends of the cylinders.

At the front part of each of the cylinder castings the electric relays are arranged. The coils 22 actuate the paper covered relay valves 23. The paper serves for preventing the valve from knocking against the metal heart of the coil. Instead of paper, leather can be used. The relay comprises further the piston 21, the upper cylindrical valve 20 and the lower cylindrical valve 19, which are connected with the relay piston 21 by means of the piston rod 24. By means of the springs 25 the cylindrical valves are pushed upwards into the inoperative position. By means of the suction pipe 26 connected with the suction side of the internal combustion engine the vacuum is obtained.

The upper cylindrical valves are unequal in length. For the forward gears those belonging to the cylinders nearest to the forks 14 are shorter than those of the other cylinders.

In consequence of the fact that when the electric current is admitted to the coils the two relay pistons 21 together with the cylindrical valves move downward in direction, the cylindrical valves at the back will open the suction canal sooner than those in front.

The lower cylindrical valves 19 cut off the connection with the atmosphere. In consequence of the fact that the cylinders are emptied unequally a smooth and gradual operation of the coupling clutch is obtained. .

Figure 3:
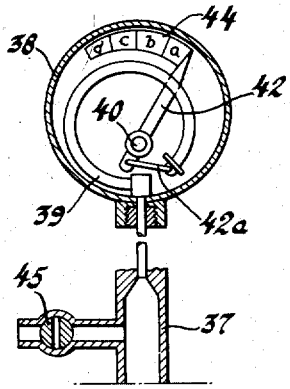
Fig. 3 shows the servo-motor which operates the switch for distributing the current of the electric power supply, said servo-motor being constructed as an ordinary manometer spring tube.

The operation of the relay is carried out by means of the pneumatic servomotor illustrated in Fig. 3, with the exception of the reverse gear which is controlled by a hand operated switch within reach of the driver (Fig. 14).

The pneumatic servomotor of Fig. 3 is operated by means of overpressure obtained with a fan 34, the rotational speed of which depends on that of the driven shaft 2 or that of the Cardan shaft 59.

According to one embodiment of the invention the fan is mounted on the driven shaft 2 (Fig. 7). The suction pipe 35 projects from the casing and is turned with the inlet opening to the wind. The inlet opening is covered with a sieve 36.

The pressure pipe 37 of the fan is connected with the inside of the bent manometer spring tube 39 and said tube constitutes in itself the pneumatic servomotor 38 which acts as pneumatic current distributer.

Said pneumatic current distributer comprises the following parts:

An excentrically bent hollow tube 39 of elliptical cross section, a shaft 40, the current distributer 42 with the small connection rod 42a. By means of Celluloid or other insulating material the distributer is insulated from the shaft.

The contact plates 44a, b, c and d correspond with the first, second, third and fourth gear and are mounted on a piece of insulating material which is fixed to the manometer casing.

A dial 90 is provided on which inscriptions (I, II, III, IV) are made corresponding with the different positions of the distributer.

In the pipe leading to the tube 39 of the pneumatic servomotor a valve 45 is arranged, by means of which the over-pressure in said pipe can be lowered to a certain degree by permitting the air to escape to the atmosphere. Said valve is operatively connected with the fuel inlet mechanism, of the internal combustion engine, and opens and closes together with said fuel inlet. This measure is necessary when driving with a high road speed, and especially when driving with a high initial speed. The diagram of Figure 4a is to show in a conventional way the operator's control of valve 45 of Figure 4. Accelerator pedal 41 pivoted to the vehicle floorboards at 41a is joined to rod 49 pivoted to bellcrank 43 which is spindled to the vehicle frame and which is connected to the ordinary engine throttle rod 50 and valve operating rod 45b. The latter is pivoted to lever 45a affixed to valve 45 which protrudes from valve casing 45c. The customary pedal retracting spring 51 serves the usual purpose.

This portion of my device enables the driver at will to maintain control over speed ratio by simple manipulation of the engine throttle and valve 45 together, increased torque demand resulting in a temporary diminishing of the ability of the governor device to shift to a higher ratio. A further superimposed manual control is established through hand-operated element 47, switch 78 and contacts 76, 79, 80 and 82, as will be described further.

The master control of the automatic change speed gear mechanism according to the invention is operated by the driver by means of a switch-box (Figs. 4, 5 and 14) arranged on the steering wheel. Said switch box 46 consists of a base with an erect marginal flange. The cover 47 of this box is provided with a rounded surface adapted to the hollow inside of the hand and serves as the switch. The ring 48 is screwed around the box and enters into a groove of the cover 47, in such a way that the cover can revolve inside the ring 48.

Inside of the vertical marginal flange seven contact springs 76, 77, 78, 79, 80, 81 and 82 are arranged, which are connected with the base by means of screws. These contact springs do not touch the flange. These springs are bent in such a way that the contact mounted in the cover remains in the middle of the spring and does not slip off on its own account.

One of the contact springs 77 (Figures 13 and 16) only serves for keeping the cover in its neutral position and is not connected with a current conducting wire (Figure 16).

From left to right appear in Fig. 5 the springs for "reverse" 76, "neutral" 77, "automatic" 78 and four other springs for hand operated transmission, first 79, second 80, third 81 and fourth 82. The hand operated transmission makes it possible to continue driving in a certain gear and may also be used if the automatic device is out of commission.

Against the bottom surface of the cover 47 a small copper plate 74 is fixed and is provided with a current conducting wire (Figure 16), together with a small roller 70, which can revolve around a small shaft, which is screwed through the plate 74 into the cover. This roller can roll along the contact springs (see Fig. 13) and closes the current circuit. In the centre of the bottom of the box an opening 93 is provided for introducing the current conducting wires. On the cover 47 an arrow 92 (Fig. 14) is illustrated and around the cover on the steering wheel figures 89 are drawn, corresponding with the situation of the different contact springs (Fig. 14); for obtaining the different positions the cover has to be turned until the arrow 92 points to the figure which stands for the required contact.

Finally there are provided visual signs 83, 84, 85, 86, 87 (Figure 15). The needle 91 on the dial 90 of manometer 38 indicates the four different positions of the distributor 42 according to the overpressure generated by the fan 34 in the pipe 37 which leads to the distributer 42. The visual signs consists in small electric lamps 83, 84, 85, 86, 87 (Figure 15) arranged on the dashboard which enable the driver to see, which of the gears is in commission. The lamps have different colours.

The lamp 83 for "reverse" is white.
The lamp 84 for "first gear" is yellow.
The lamp 85 for "second gear" is red.
The lamp 86 for "third gear" is blue.
The lamp 87 for "fourth gear" is green.

For fourth gear a green lamp 87 is used, this being the colour which is most beneficial for the eyes. This color code may be varied to meet the needs of the designer.

The electric power supply may consist of a storage battery or a generator of about 12 volts.

The device according to the invention operates as follows.

When the car is standing still, the arrow on the switch box 46 indicates neutral. The motor is started while the motor clutch (not illustrated) is shifted out of operation. Now the arrow is turned to "automatic" and consequently the first gear is shifted into operative position. Now the yellow lamp is burning.

The electric current now flows from the electric power supply 88 to the switch box 46 (Figs. 4, 5 and 16), from there over the small copper plate 74, the roller 70, the contact springs 78 to the current distributer 42 (Figs. 3 and 16) and then along the contact piece 44*a* to the coils 22 (Figs. 1 and 16). Next it passes the trailing contact 71 on the valve stem 24 on its way to the lamp 84 and after that it returns to the power supply.

The coils 22 of the first gear now lift the relay valves 23. The suction of the internal combustion engine can now empty the cylinders 65 and thereby pull the relay pistons 21 downward in direction. At the same time the cylindrical valves 19 and 20 are shifted.

The upper valves 20 connect the canals 27 with the suction pipe 26, and the lower valves 19 cut off the inside of the cylinder from the atmosphere.

The cylinders 72 are now emptied. The rear cylinder (nearest fork 14) is emptied sooner than the front. The pistons 18 move to the left with the piston rod 17. In consequence thereof the lower arm 15 of the lever 14 is moved to the right. The clutch of the first gear is shifted into operative position and the first gear is brought into operation.

We now fix an initial speed, the value of which is in itself not so very important, because regardless of whether a low or a high initial speed is chosen, the car will always start smoothly without any shock. This is due to the series action of the disc-clutches, both of the motor clutch and that of the first gear, which ensure a smooth start. According to the starting speed which we have chosen the fuel admission to the combuston engine is regulated and in consequence of the fact that the fuel admission mechanism, e. g. the gas-pedal or lever, is connected with the control valve 45, this control valve will follow the gas-admission mechanism and will open. The Figure 4 showing of valve 45 is, of course, schematic, and various types of commonly known forms may be used within the scope of my invention.

The minimum initial speed at which the servomotor 38 can work may be fixed at 5 km. per hour (about 2.8 miles per hour). With a lower initial speed the number of revolutions per minute of the ventilator 34 would be too little to produce a sufficient pressure necessary for actuating the current distributer 42.

Up to an engine speed corresponding to approximately 5 km./hour the valve 45 remains closed. Above this speed the valve gradually opens and causes a diminishing of pressure in the conduit. This low speed range operation is therefore entirely by speed response. This is necessary, for if the overpressure would not be partly relieved, it would occur that with a great initial speed the automatic current distributer, instead of gradually putting into operation the successive gears, would jump from first to fourth gear. It is likewise possible to arrange the capacities of the blower manometer 39 and valve 45 so that at extreme car speeds, the valve 45 cannot affect shift of ratio from the top speed to a lower gear.

Now we lift our foot from the motor clutch pedal and the car is running in first gear.

It is obvious that the initial speed when driving in first gear is not so great as the ultimate speed obtained when driving in this gear, because at first the motor disc-clutch is not fully operative. Gradually the slipping of the motor disc-clutch diminishes to zero and at last the motor has accelerated the car up to the ultimate speed obtainable with the chosen amount of fuel admission when driving in the first gear. At that time the rotational speed of the fluid pressure rotor or fan has increased so much that the pressure obtained with it is sufficient for moving the distributer 42 into the position for second gear, and releasing the first gear. However, the first gear is not released all at once by the fluid pressure actuating mechanism. The springs 25 begin to lift the circular valves and to open the connection 28 with the atmosphere. The upper valve of the front cylinder has already cut off the connection with the suction pipe when the upper valve of the back cylinder has still to complete its action, and when both are shut it still takes some time before the large cylinder is completely filled with air, and the pistons are shifted back by means of the spring 30.

The time required for this is very short, but sufficient to prevent a sudden break-off, and it is longer than the time required for emptying the cylinders of the second gear.

The coupling operation in the second gear is also carried out without any shock. This is obtained by emptying the front and back cylinders unequally and by the smooth operation of the clutch. Here too, the initial speed is lower than the ultimate speed. Consequently when said ultimate speed has been reached the rotational speed of the fan is sufficient to induce the distributor to move to the position corresponding to third gear.

For shifting in the fourth gear the same regime is repeated.

Now the speed of the car can be increased by increasing the amount of fuel admitted to the combustion engine by depression of pedal 41 of Fig. 4*a* in the customary manner. Also the valve 45 is opened further so that no overpressure is available for the manometer. Therefore ratio shift may dwell in direct for normal driving conditions.

If the car is on an up grade, it may occur that the engine is not powerful enough to drive the car in the highest gear, and although the fuel admission remains unvaried, the speed of the car decreases. In consequence thereof the fan is rotating slower and the valve 45 remaining in open position will cause the distributor to occupy a position corresponding with a lower gear. The torque on the motor shaft is in this way diminished. This provides the advantage that gear shifting by hand when driving up a slope is no longer necessary.

The condition of the control system at rest is that of Figure 1. Atmospheric pressure is felt through passages 28, on the left face of pistons 18, and in porting 27. Springs 30 bias pistons 18 and rods 17 to occupy a right-hand position.

When, for example, current is supplied to solenoid 22, valve 23 is lifted as shown at the left, engine vacuum in porting 26 may act on the under face of plunger 21 attached to rod 24, and draw the assembly 24—20—19 down against the force of spring 25. An air vent (not numbered) in the upper portion of the valve casing permits this action to take place.

Piston valve 20 ceases to block 26—27, thereupon engine vacuum is admitted to the left of piston 18, which moves left against the force of spring 30, rocking lever 14 so as to load clutch 3 as described. While valve 20 is uncovering port 26 to port 27, valve 19 is also moving to seal passage 28 from atmospheric pressure. The continuation of electric current in solenoid 22, with sustained lift of valve 23 causes engine vacuum to draw boss 21 down, retaining valve 20 open and valve 19 closed, therefore the effect of the engine vacuum is to load the clutch presser plate 11 of the clutch 3 selected for actuation, establishing drive, assisted by the torque thrust loading effect of the helical gears described preceding.

Now when the current is cut off, the solenoid force cannot further hold valve 23 against the suction of the engine vacuum in passage 26, therefore valve 23 closes, and springs 25 force the assembly 20—24—19 upward into the position of Figure 9, closing off the vacuum manifold connection in 26 from passage 27 and cylinder 72, and opening cylinder 72 to atmosphere through passage 28.

It should be noted that this control operates as a relay system, the actual shifting of the ratio selecting valving 19—20 being done by the fluid pressure and by springs 25. The action of valve 23 is a piloting action, and the electrical force required to hold it in servo energizing position is much less than that needed to oppose springs 25 directly, if the solenoids were made to act directly on plungers 24.

The following are some figures relating to the operation of the device (Fig. 2).

The relation between the diameters of the gear wheels may be as follows:

| | Driving shaft | Driven shaft |
|---|---|---|
| First gear | 8 | 19 |
| Second gear | 9 | 18=1:2 |
| Third gear | 11 | 16 |
| Fourth gear | 13½ | 13½=1:1 |

We assume that for an initial road speed of 5 km./hour the motor shaft makes 200 revolutions per minute. This number of revolutions is assumed for the highest gear. Now after lifting our foot from the motor clutch pedal some time will elapse before the driving gear wheel of the first gear will have reached the same number of revolutions per minute as the motor shaft, that is 200 revolutions per minute, because said gear wheel is subject to the braking influence of the car inertia.

As soon as this number of revolutions is reached, the secondary gear wheel **2*b* makes $\frac{8}{19}\times 200=84.21$ revolutions per minute. The secondary gear wheel 2*e* also makes 84.21 revolutions per minute and in consequence of the relation 1:1 between the wheels 2*e* and 1*e*, the Cardan shaft also makes 84.21 revolutions per minute. The gear wheel 1*c*** of the second gear which rotates freely on the driving shaft and which is rotating together with the secondary gear wheel 2c makes $\frac{18}{9}\times 84.21=168.42$ revolutions per minute.

Now the second gear is put into operation and the driving shaft which keeps revolving at 200 revolutions per minute will accelerate the wheel 1c of the second gear from 168.42 to 200 revolutions per minute. When this has been done, the secondary wheen 2c makes $\frac{1}{2}\times 200=100$ revolutions, and also the Cardan shaft, while the wheel 1d of the third gear makes $\frac{16}{11}\times 100=145.45$ revolutions per minute.

Now the third gear is shifted into operation and the wheel 1d is brought from 145.45 to 200 revolutions per minute. Now the secondary wheel 2d revolves at $\frac{11}{16}\times 200=137.5$ revolutions per minute, and also the Cardan shaft.

Finally when shifting into the fourth gear the Cardan shaft is grought from 137.5 to 200 revolutions per minute. It is understood, of course, that the operator is under no compulsion to hold the throttle at 200 or any other fixed R. P. M., since the applied load of the vehicle will need to be compensated for, to avoid stalling the engine. After this the speed may be increased by increasing the admission of fuel in the normal manner.

Because the clutches operate gradually, sudden acceleration of the output shaft is prevented.

Also on an increasing speed cycle the next clutch is put into operation at a faster rate than the former is released, and so excessive acceleration of the shaft is impossible.

The driving shaft will practically keep revolving with the same approximate rotational speed and without intermission the driven shaft will be gradually accelerated.

According to the foregoing, the mechanism successively revolves at the following number of revolutions per minute:

| | | |
|---|---|---|
| Ultimate speed | First gear | 84.21 revolutions p. min. |
| Do | Second gear | 100 revolutions p. min. |
| Do | Third gear | 137.5 revolutions p. min. |

According to these figures, the automatic device is adjusted to be able to handle successive shifting of the different gears into operation while the motor shaft keeps revolving at 200 revolutions per minute in such a way that ultimately the car runs at a speed of 5 km./hour in the highest gear.

From now on the constant fuel admission, which has been approximately maintained throughout the successive operation of the different gears and which corresponds to a driving speed of 5 km./hour in the nighest gear, may be entirely abandoned and said admission increased at will until the desired driving speed of the car (e. g. 60 km./hour or more) is reached. It will be understood that the fluid servo devices described in this specification as pneumatically operating exemplify and do not delimit the application of my invention to purely super or subatmospheric fluid pressure, and may be simply adapted to other forms of fluid pressure.

I make no claim to a specific form of fluid pressure medium except as defined in certain claims descriptive of the specific apparatus of my disclosure, but reserve the right to utilize my invention with fluid pressure media such as are common, well-known and available to myself and others.

What I claim is:

1. Automatic change speed gear mechanism specially adapted for motor vehicles comprising a driven shaft, an automatic device embodying a fan mounted on said driven shaft, a first pneumatic servomotor operating under the influence of the difference in pressure generated by said fan, a current distributing device comprising several contact pieces operated by said pneumatic servomotor, an electric power supply connected with said current distributing device, conducting means fixed to the contact pieces of the current distributing device, coils connected with said conducting means, a second pneumatic servomotor, a differential pressure supply for actuating said last mentioned pneumatic servomotor, control means for controlling the admission and the outlet of the air of said last mentioned pneumatic servomotor, said control means being actuated by said coils, a driving shaft, gear wheels freely rotating on said driving shaft, gear wheels fixed to said driven shaft, said gear wheels on said driven shaft constantly meshing with said gear wheels on said driving shaft, coupling means for coupling said gear wheels on said driven shaft with said driving shaft, connecting means for connecting said last mentioned pneumatic servomotor with one of said coupling means, a hand operated switch for putting the automatic device into or out of operation.

2. Automatic change speed gear mechanism specially adapted for motor vehicles, comprising a driven shaft, an automatic device embodying a fan mounted on said driven shaft, a hollow circular manometer tube operating under the influence of the difference in pressure generated by said fan, a current distributing device comprising several contact pieces, operated by said pneumatic servo-motor, an electric power supply connected with said current distributing device, conducting means fixed to the contact pieces of the current distributing device, coils connected with said conducting means, a second pneumatic servo-motor, a differential pressure supply for actuating said last mentioned pneumatic servomotor, control means for controlling the admission and the outlet of the air of said last mentioned pneumatic servomotor, said control means being actuated by said coils, a driving shaft, gear wheels freely rotating on said driving shaft, gear wheels fixed to said driven shaft, said gear wheels on said driven shaft constantly meshing with said gear wheels on said driving shaft, coupling means for coupling said gear wheels on said driven shaft with said driving shaft, connecting means for connecting said last mentioned pneumatic servomotor with one of said coupling means, a hand operated switch for putting the automatic device into or out of operation.

3. Automatic change speed gear mechanism, specially adapted for motor vehicles, comprising a motor shaft, a Cardan shaft, gear wheels fixed to said Cardan shaft meshing with gear wheels rotatably mounted on said motor shaft, coupling means for coupling said gear wheels on the motor shaft with said motor shaft, springs for maintaining said coupling means in their inoperative positions, a number of pneumatic servo-motors for actuating said coupling means, a pneumatic power supply, inlet and outlet elements for the air of said pneumatic servo-motors, a number of pneumatic actuating means for actuating said inlet and outlet elements, a number of electric control means for controlling said pneumatic actuating means, an automatically operating electric current distributing device comprising a number of contact pieces corresponding with the number of ahead gears, another pneumatic servomotor for actuating said current distributing device, said last-mentioned pneumatic servo-motor operating under the influence of the change of pressure generated by a fan, which is driven by said Cardan shaft, an exhausting valve on the pressure conduit leading from said fan to said last-mentioned pneumatic servo-motor, connecting means for connecting said exhausting valve with the fuel admission mechanism of the motor, an electric power supply, a hand operated switch connected with said electric power supply, contact means on said switch corresponding with the electric current circuit of said distributing device, a further number of contact means on said switch corresponding respectively with the electric current circuits of the several electric control means for controlling the distribution of the air in said first mentioned number of pneumatic servomotors, said contact means being arranged on said switch in such a way that either the electric current circuit of the distributing device or one of the circuits of the different electric control means can be put in commission, such as desired.

4. Automatic change speed gear mechanism specially adapted for motor vehicles, comprising a motor shaft, a Cardan shaft, a countershaft, transmitting means for transmitting the torque up from said countershaft to said Cardan shaft, gear wheels freely rotating on said motor shaft constantly meshing with gear wheels fixed on said countershaft, coupling means for coupling said gear wheels on the motor shaft with said motor-shaft and for directly coupling said motor-shaft with said Cardan shaft, springs for maintaining said coupling means in their inoperative positions, a number of pneumatic servo-motors for actuating said coupling means, a pneumatic power supply, inlet and outlet elements for the air of said pneumatic servomotors, a number of pneumatic actuating means for actuating said inlet and outlet elements, a number of electric control means for controlling said pneumatic actuating means, an automatically operating electric current distributing device comprising a number of contact pieces corresponding with the number of ahead gears, another pneumatic servo-motor for actuating said current distributing device, said last-mentioned pneumatic servo-motor operating under the influence of the change of pressure generated by a fan, which is driven by said Cardan shaft, an exhausting valve on the pressure conduit leading from said fan to said last-mentioned pneumatic servo-motor, connecting means for connecting said exhausting valve with the fuel admission mechanism of the motor, an electric power supply, a hand operated switch connected with said electric power supply, contact means on said switch corresponding with the electric current circuit of said distributing device, a further number of contact means on said switch corresponding respectively with the electric current circuits of the several electrical control means for controlling the distribution of the air in said first-mentioned number of pneumatic servomotors, said contact means being arranged on said switch in such a way that either the electric current circuit of the distributing device or one of the circuits of the different electric control means can be put in commission, such as desired.

5. Automatic change speed gear mechanism specially adapted for motor vehicles, comprising a motor shaft, a Cardan shaft, gear wheels fixed to said Cardan shaft meshing with gear wheels rotatably mounted on said motor shaft, coupling means for coupling said gear wheels on the motor shaft with said motor shaft, springs for maintaining said coupling means in their inoperative position, a number of pneumatic servomotors for actuating said coupling means, a pneumatic power supply, inlet and outlet elements for the air of said pneumatic servo-motors, a number of pneumatic actuating means for actuating said inlet and outlet elements, a number of electric control means for controlling said pneumatic actuating means, an automatically operating electric current distributing device comprising a number of contact pieces corresponding with the number of ahead gears, another pneumatic servo-motor for actuating said current distributing device, said last-mentioned pneumatic servo-motor operating under the influence of the change of pressure generated by a fan, which is driven by said Cardan shaft, an exhausting valve on the pressure conduit leading from said fan to said last-mentioned pneumatic servo-motor, connecting means for connecting said exhausting valve with the fuel admission mechanism of the motor, an electric power supply, a hand operated switch connected with said electric power supply, contact means on said switch corresponding with the electric current circuit of said distributing device, a further number of contact means on said switch corresponding respectively with the electric current circuits of the several electric control means for controlling the distribution of the air in said first mentioned number of pneumatic servo-motors, said contact means being arranged on said switch in such a way that either the electric current circuit of the distributing device or one of the circuits of the different electric control means can be put in commission, such as desired, said pneumatic servo-motor for actuating the current distributing device being formed as a manometer.

6. Automatic change speed gear mechanism, specially adapted for motor vehicles, comprising a motor shaft, a Cardan shaft, gear wheels fixed to said Cardan shaft meshing with gear wheels rotatably mounted on said motor shaft, coupling means for coupling said gear wheels on the motor shaft with said motor shaft, springs for maintaining said coupling means in their inoperative positions, a number of pneumatic servo-motors for actuating said coupling means, comprising small electrically operated control valves, cylindrical inlet and outlet valves, small pistons actuating said cylindrical valves and controlled by said electrically operated small valves, springs for bringing back said cylindrical valves to their initial position, large pistons controlled by said cylindrical inlet and outlet valves, said pistons being connected with said coupling means, a pneumatic power supply, a number of pneumatic actuating means for actuating the inlet and the outlet valves for the air of said pneumatic servomotors, a number of electrical control means for controlling said pneumatic actuating means, an automatically operating electric current distributing device comprising a number of contact pieces corresponding with the number of ahead gears, another pneumatic servo-motor for actuating said current distributing device, said last-mentioned pneumatic servo-motor operating under the influence of the change of pressure generated by a fan, which is driven by said Cardan shaft an exhausting valve on the pressure conduit leading from said fan to said last-mentioned pneumatic servo-motor, connecting means for connecting said exhausting valve with the fuel admission mechanism of the motor, an electric power supply, a hand operated switch connected with said electric power supply, contact means on said switch corresponding with the electric current circuit of said distributing device, a further number of contact means on said switch corresponding respectively with the electric current circuits of the several electric control means for controlling the distribution of the air in said first-mentioned number of pneumatic servo-motors, said contact means being arranged on said switch in such a way that either the electric current circuit of the distributing device or one of the circuits of the different electric control means can be put in commission, such as desired, each of said pneumatic servo-motors for actuating the coupling means comprising two cylinders in which work two pistons which are fixed on a single piston rod and the cylindrical valves which control the inlet of the air into said cylinders being provided with an overlap which is different for both cylinders.

7. Automatic change speed gear mechanism, specially adapted for motor vehicles, comprising a motor shaft, a Cardan shaft, gear wheels fixed to said Cardan shaft meshing with gear wheels rotatably mounted on said motor shaft, coupling means for coupling said gear wheels on the motor shaft with said motor shaft, springs for maintaining said coupling means in their inoperative positions, a number of pneumatic servo-motors for actuating said coupling means, a pneumatic power supply, inlet and outlet elements for the air of said pneumatic servo-motors, a number of pneumatic actuating means for actuating said inlet and outlet elements, a number of electric control means for controlling said pneumatic actuating means, an automatically operating electric current distributing device comprising a number of contact pieces corresponding with the number of ahead gears, another pneumatic servo-motor for actuating said current distributing device, said last-mentioned pneumatic servo-motor operating under the influence of the change of pressure generated by a fan, which is driven by said Cardan shaft, an exhausting valve on the pressure conduit leading from said fan to said last-mentioned pneumatic servo-motor, connecting means for connecting said exhausing valve with the fuel admission mechanism of the motor, an electric power supply, a hand operated switch connected with said electric power supply, contact means on said switch corresponding with the electric current circuit of said distributing device, a further number of contact means on said switch corresponding respectively with the electric current circuits of the several electric control means for controlling the distribution of the air in said first mentioned number of pneumatic servo-motors, said contact means being arranged on said switch in such a way that either the electric current circuit of the distributing device or one of the circuits of the different electric control means can be put in commission, such as desired, and a reverse gear adapted to be operated by means of a coupling mechanism actuated by a pneumatic servo-motor, said last-mentioned pneumatic servo-motor being controlled by an electrical control device which can be put into and out of operation by means of said hand operated switch, in such a way that by means of said switch either said automatic distributing device, or one of said ahead gears, or the reverse gear is put in operation.

8. Automatic change speed gear mechanism, specially adapted for motor vehicles, comprising a motor shaft, a Cardan shaft, gear wheels fixed to said Cardan shaft meshing with gear wheels rotatably mounted on said motor shaft, coupling means for coupling said gear wheels on the motor shaft with said motor shaft, springs for maintaining said coupling means in their inoperative positions, a number of pneumatic servo-motors for actuating said coupling means, comprising small electrically operated control valves, cylindrical inlet and outlet valves, small pistons actuating said cylindrical valves and controlled by said electrically operated small valves, springs for bringing back said cylindrical valves to their initial position, large pistons controlled by said cylindrical inlet and outlet valves, said pistons being connected with said coupling means, a pneumatic power supply, a number of pneumatic actuating means for actuating the inlet and the outlet valves for the air of said pneumatic servo-motors, a number of electrical control means for controlling said pneumatic actuating means, an automatically operating electric current distributing device comprising a number of contact pieces corresponding with the number of ahead gears, another pneumatic servo-motor for actuating said current distributing device, said last-mentioned pneumatic servo-motor operating under the influence of the change of pressure generated by a fan, which is driven by said Cardan shaft, an exhausting valve on the pressure conduit leading from said fan to said last-mentioned pneumatic servo-motor, connecting means for connecting said exhausting valve with the fuel admission mechanism of the motor, an electric power supply, a hand operated switch connected with said electric power supply, contact means on said switch corresponding with the electric current circuit of said distributing device, a further number of contact means on said switch corresponding respectively with the electric current circuits of the several electric control means for controlling the distribution of the air in said first-mentioned number of pneumatic servo-motors, said contact means being arranged on said switch in such a way that either the electric current circuit of the distributing device or one of the circuits of the different electric control means can be put in commission, such as desired, each of said pneumatic servo-motors for actuating the coupling means comprising two cylinders in which work two pistons which are fixed on a single piston rod and the cylindrical valves which control the inlet of the air into said cylinders being provided with an overlap which is different for both cylinders, and a reverse gear adapted to be operated by means of a coupling mechanism actuated by a pneumatic servo-motor, said last mentioned pneumatic servo-motor being controlled by an electrical control device which can be put into and out of operation by means of said hand operated switch in such a way that by means of said switch either said automatic distributing device, or one of said ahead gears, or the reverse gear is put in operation.

9. Automatic change speed gear mechanism specially adapted for motor vehicles, comprising a motor shaft, a Cardan shaft, a countershaft, transmitting means for transmitting the torque from said countershaft to said Cardan shaft, gear wheels freely rotating on said motor shaft constantly meshing with gear wheels fixed on said countershaft, coupling means for coupling said gear wheels on the motor shaft with said motor-shaft and for directly coupling said motor-shaft with said Cardan shaft, springs for maintaining said coupling means in their inoperative positions, a number of pneumatic servo-motors for actuating said coupling means, comprising small electrically operated control valves, cylindrical inlet and outlet valves, small pistons actuating said cylindrical valves and controlled by said electrically operated small valves, springs for bringing back said cylindrical valves to their initial position, large pistons controlled by said cylindrical inlet and outlet valves, said pistons being connected with said coupling means, a pneumatic power supply, a number of pneumatic actuating means for actuating the inlet and the outlet valves for the air of said pneumatic servo-motors, a number of electrical control means for controlling said pneumatic actuating means, an automatically operating electric current distributing device comprising a number of contact pieces corresponding with the number of ahead gears, another pneumatic servo-motor for actuating said current distributing device, said last-mentioned pneumatic servo-motor operating under the influence of the change of pressure generated by a fan, which is driven by said Cardan shaft, an exhausting valve on the pressure conduit leading from said fan to said last-mentioned pneumatic servo-motor, connecting means for connecting said exhausting valve with the fuel admission mechanism of the motor, an electric power supply, a hand-operated switch connected with said electric power supply, contact means on said switch corresponding with the electric current circuit of said distributing device, a further number of contact means on said switch corresponding respectively with the electric current circuits of the several electrical control means for controlling the distribution of the air in said first-mentioned number of pneumatic servo-motors, said contact means being arranged on said switch in such a way that either the electric current circuit of the distributing device or one of the circuits of the different electrical control means can be put in commission, such as desired, each of said pneumatic servo-motors for actuating the coupling means comprising two cylinders in which work two pistons which are fixed on a single piston rod and the cylindrical valves which control the inlet of the air into said cylinders being provided with an overlap which is different for both cylinders, and a reverse gear adapted to be operated by means of a coupling mechanism actuated by a pneumatic servo-motor, said last-mentioned pneumatic servo-motor being controlled by an electrical control device which can be put into and out of operation by means of said hand operated switch in such a way that by means of said switch either said automatic distributing device, or one of said ahead gears, or the reverse gear is put in operation.

10. In a change speed gear mechanism for gradually varying the speed of a mechanism to be driven, speed-changing gearing, a driven shaft, pneumatic means responsive to variations in the speed of rotation of said shaft, electrical means successively actuatable by said pneumatic means, and other pneumatic means controlled by said electrical means for shifting the gearing automatically in accordance with the speed of the driven shaft.

11. In combination with a change speed gear mechanism, pneumatic means for shifting clutches associated with the gears of said mechanism in a smooth manner, a second penumatic means for controlling the first said means, electrical means for controlling said second pneumatic means, a third pneumatic means for controlling said electrical means, and manually operable means for rendering said third pneumatic means ineffective to control said electrical means, said manually operable means permitting manual control of said electrical means.

12. In a change speed gear mechanism for gradually varying the speed of a mechanism to be driven, an engine throttle control, step ratio speed-changing gearing including friction elements for gradually taking up of the drive in each ratio, driving and driven shafts associated with said gearing, ratio selective means responsive to variations in speed of one of said shafts, said means being associated with a governor, fluid pressure means for shifting the gearing to a different ratio subject to the action of said selective means and said governor, and manually operated mechanism including a device coordinating the action of the governor with movement of said throttle control arranged to coact with said selective means whereby the selection of the driving speed ratio is conditioned through the torque demand determined by the operator.

13. In combination with a change speed gear mechanism connecting driving and driven shafts, fluid pressure actuators for shifting friction devices associated with the gears of said mechanism in a smooth manner, a control mechanism for said actuators, means responsive to the speed of one of said shafts operative upon said mechanism, manually operative means for conditioning said speed responsive means according to torque demand, and further manual means effective to set aside the action of both said manual and speed responsive means at the will of the operator.

14. In automatic controls for automotive vehicles, in combination, a variable speed engine connected to a driving shaft, a driven shaft, a variable speed ratio transmission connecting said shafts, embodying fluid pressure actuatable speed change members, fluid pressure servo means made effective by operation of said engine, valving controlling the action of the fluid pressure provided by said means upon said members, a speed responsive governor driven by one of the said shafts operatively connected with said valving and controlling the actuation of said members, and manually operable means for conditioning the governor effect upon said valving at the will of the operator.

15. An automatic transmission mechanism for a vehicle having an engine, a driving shaft, a driven shaft, a friction clutch for connecting the shafts in direct drive, means for connecting the shafts at a geared speed ratio when said clutch is released, a governor driven by one of the shafts, means for actuating the clutch including fluid pressure motor devices subject to the action of said governor, an engine accelerator control, and coacting means influenced by motion of said control to effect response by said actuating means operable to cause engagement of said clutch or to cause said first named means to drive upon predetermined movements of said control, said coacting means being effective to compel change of ratio from direct drive established by said first named clutch to geared drive established by said first named means for predetermined speed ranges of said governor.

16. In a transmission mechanism, a driving shaft, a driven shaft, a friction clutch adapted to connect the shafts for direct drive, a speed responsive device operating at the speed of one of the shafts, power means arranged to cause actuation of the clutch subject to the control of said device, a gear train connecting the shafts around the clutch at a geared speed ratio, an engine throttle control and coacting means connected to said control and operative to vary the speed at which said device becomes effective to select direct drive or geared drive whereby the driving speed ratio is determined according to the will of the operator and the driving conditions.

17. In a motor vehicle, in combination, an engine, a throttle control for the engine, a driving and a driven shaft, a variable speed transmission between the shafts, speed ratio establishing devices for the transmission, a plurality of fluid pressure motors for actuating said devices, a governor responsive to the speed of one of the shafts adapted to control the actuation of said motors, and coacting means moved by said throttle control effective upon said governor control whereby the engine accelerating motion of said throttle causes said fluid pressure motors to shift said variable speed transmission to a lower speed ratio.

18. In motor vehicles in combination, an engine connected to a power shaft, a throttle for said engine, a variable speed power transmission driven by said power shaft embodying friction means to transmit drive in direct or through gearing, a driven shaft driven by said transmission, speed ratio changing means for the transmission connected to said friction means, auxiliary servo means operative by fluid pressure connected to said speed ratio changing means for affecting the change of ratio in the transmission, a speed responsive governor operative at the speed of one of the shafts, a device responsive to movement of said throttle coacting with said governor, and movable means effective upon the speed ratio changing means according to movement of said throttle and said speed responsive governor whereby the interaction of forces is effective to select direct drive, or drive through said gearing by said friction means.

19. In a motor vehicle, in combination, an engine, a throttle for the engine, a driving and a driven shaft, a variable speed transmission between the shafts, speed ratio control devices for the transmission, servo means operative by fluid pressure for actuating said devices, a governor responsive to the speed of one of the shafts adapted to control said means, and means moved by said throttle effective to vary the effect of said governor on said fluid pressure means whereby the engine decelerating motion of said throttle causes said fluid pressure actuated devices to shift said variable speed transmission to a higher speed ratio.

20. In automatic controls for power transmissions, in combination, a transmission mechanism including a speed changing element, graduating means controlling the rate of application of said element, a control device for said element, speed responsive apparatus responding to the speed of said mechanism continuously operative to shift said device and additional manual means operative to influence and control said apparatus whereby the action of said device is conditioned and selected by the will of the operator.

21. In motor vehicle controls, in combination, a variable speed transmission, a plurality of friction devices arranged to establish variable speed drive by said transmission, graduation control means effective upon said devices to control the degree of loading thereof for varying torque conditions of said drive, a governor driven by said transmission adapted to control selection of the different forward driving speed ratios and consequent actuation of said devices upon said governor selection action, a manual control operative to select different forward driving speed ratios and consequent actuation of said devices upon said manual selection action, and means operated by said control when it is placed in a plurality of forward driving positions effective in such positions to inhibit the selection of any driving speed ratio by said governor.

22. In variable speed gearing, in combination, a cyclically operable drive mechanism comprising, an input shaft, an output shaft, a plurality of friction driving elements rotating with said input shaft constituting clutch means, a plurality of friction driven elements rotatable at step ratio speeds with respect to said input shaft, constituting coacting clutch means, graduating means controlling the action of said elements, auxiliary fluid power means arranged to become effective upon coacting pairs of said clutch means, and automatically operable distribution means subject to the speed of one of the said shafts for said power means adapted to establish through the agency of said power means only one pair of friction driving and driven elements at a time during the driving interval of said mechanism.

23. In variable speed gearing controls, in combination, a control system comprising, a governor-operated selector movable into predetermined forward speed ratio selecting positions, a manually-operable selector movable into neutral, forward, and a plurality of forward speed ratio positions, a plurality of friction driving elements connectable for variable speed drive of a transmission mechanism, auxiliary power means arranged to actuate said elements, controlled by movement of both of said selectors, graduation control means effective upon said auxiliary power means, and connecting coacting means between said selectors effective to permit independent selection by said first named selector in one position of said manual selector, and to prevent said independent selection in a second position of said manual selector.

24. In variable speed transmissions, in combination, driving and driven members, a speed change mechanism coupling said members, friction driving means included in said mechanism, graduation control means effective upon said friction driving means, a governor responsive to the speed of one of said members for controlling the operation of said mechanism, power means operative upon said mechanism and speed ratio selecting means for instantly rendering said governor ineffective while independently rendering said power means subject to manual control for forward drive at different speed ratios.

25. In variable speed drives for vehicles, in combination, a driving member, a driven member, a variable speed transmission connecting the members, a plurality of fluid pressure means for actuating friction devices to establish selective forward speed ratios of said transmission, graduation controls for said devices, a fluid pressure source adapted to supply said fluid pressure means, speed responsive means driven by one of said members for controlling distribution of fluid pressure from said source to any one of said fluid pressure means, a manually movable selector movable to forward speed selecting positions arranged to control distribution of fluid pressure from said source to said fluid pressure means, and connecting controls arranged to inhibit the action of said speed responsive means in controlling the distribution of fluid pressure for predetermined speed ratio selecting positions of said manually movable selector.

26. In motor vehicle drive controls, in combination, variable change speed means comprising a plurality of fluid pressure sustained paired friction elements connecting driving and driven shafts, a plurality of automatically operable valves interposed between a source of fluid pressure and compartments in which shifters for said elements are mounted, adapted to establish drive selectively through said pairs, governor mechanism driven by said means arranged to control said valves for forward drive, and manually operable selector means arranged to set aside the action of said mechanism, while establishing forward drive through another pair of elements than that in which drive was established by said mechanism.

27. In motor vehicle drive controls, in combination, a driving shaft, a driven shaft, a multi-speed gear unit embodying friction clutch driving elements operable by fluid pressure and including graduation control means for said elements adapted to transfer ratio drive while maintaining continuous torque, automatically varied fluid pressure clutch controls for causing connection of said shafts through said unit, a governor selector mechanism driven by one of said shafts effective to select drive in said clutches, and disconnecting means for said clutches operable at the will of the vehicle driver to selectively establish drive in low gear or in an intermediate speed ratio irrespective of the governor mechanism, said means being likewise operable to establish drive in direct or to shift drive to another speed ratio than direct without interference by the said mechanism.

28. In motor vehicles, in combination, a drive shaft, a driven shaft, variable change speed gearing coupling said shafts, friction clutch mechanisms operable to establish different forward speed ratios through said gearing including fluid pressure devices to sustain drive in said mechanisms, graduation controls for said devices, speed responsive means subject to the speeds of one of said shafts for selecting operation of said fluid pressure devices, manually operable controls movable to selective change speed positions effective to permit or prevent operation of said means independently of force developed by said means, and arranged when moved to reverse drive position to release or inhibit drive by said mechanisms.

29. The combination of a change speed selector, manually controlled means including valving for distributing fluid pressure serially to variable speed ratio friction clutching elements embodied in a transmission device, input and output members adapted to be coupled by said elements, a change speed transmission coupled by said elements, graduation controls for said elements, speed responsive mechanism subject to the speeds of one of said members coupled by said elements for progressively changing the drive of the output member from lowest to highest or from highest to lowest speed ratio, and means under the control of said selector to immediately put said change speed transmission in any of said ratios selectable by said mechanism while setting aside instantly further changing of drive ratio by said mechanism.

30. In motor vehicle controls, in combination, a drive shaft, a driven shaft, variable change speed gearing between the shafts, friction clutch mechanisms operable to establish different speed ratios through said gearing including fluid pressure devices to sustain drive in said mechanisms, and including graduation control means for said devices, speed responsive means subject to the speeds of one of said shafts for operating said fluid pressure devices, and manually operable controls movable to selective change speed positions effective to permit or prevent operation of said means independently of force developed by said means.

31. In motor vehicle controls, in combination, a drive shaft, a driven shaft, variable change speed gearing between the shafts, friction clutch mechanisms operable to establish different speed ratios through said gearing including fluid pressure devices to sustain drive in said mechanisms and including graduation controls for said devices, speed responsive means driven by one of said shafts for operating said fluid pressure devices, a manually operable control movable to selective change speed positions effective thereby to permit or prevent operation of said means independently of force developed by said means, said control when moved to neutral position definitely inhibiting drive by any of said clutch mechanisms.

32. In master controls for an automatically operated change speed gearing, multi-speed friction clutching devices, graduation controls for said devices, a speed controlled means driven by said gearing operative to establish selective actuation of said devices, a manually controlled means operative conjointly with said speed controlled means to establish selective actuation of said devices, and a further manually controlled means arranged to permit or prevent said selective actuation of both said means at will.

33. In variable speed ratio controls for vehicles, in combination, an input shaft, an output shaft, primary drive means adapted to be directly connected to said input shaft and geared to drive said driven shaft to rotate reversely to said input shaft, forward drive means adapted to connect said shafts comprising multi-speed clutching devices engageable by fluid pressure including graduation control means for said devices, a fluid pressure system arranged to engage said devices, automatic control mechanism for said forward drive means operation upon said system and adapted to move selective valving according to the speed of one of the shafts, and a manual control arranged to establish reverse drive by said primary drive means simultaneously effective to inhibit the action of said mechanism.

34. In variable speed gearing, in combination, driving and driven shafts, a plurality of constantly meshed gear trains interposed between said shafts, a plurality of clutch members transmitting drive selectively through said trains, a plurality of actuation devices for said members, an auxiliary power servo system including selective control means connected to said devices, frictionally operating torque sustaining elements embodied in each of said devices, graduation control means for said devices, automatic means subject to the speed of one of the said shafts, adapted to select driving speed ratio in said gear trains and connected to operate said control means, manually controlled means adapted to coact with said automatic means to select driving speed ratio in said gear trains, and an auxiliary control operative upon said automatic means and said controlled means effective to set aside any driving speed ratio established by either said automatic means or said manually controlled means.

35. In motor vehicles, an engine, a power control for said engine, a power shaft and a load shaft, a variable speed ratio transmission coupling said shafts embodying friction elements operative when actuated to establish selected speed ratio drive in said transmission, a pipe carrying fluid pressure generated by rotation of said engine, fluid servo pressure shift actuation means adapted to be operated by the fluid pressure in said pipe, valving arranged to regulate the distribution of said fluid pressure from said pipe to said means, graduation means effective to control the rate of actuation by said actuation means upon said elements, a speed responsive governor driven by one of said shafts, a power control for said engine, and means responsive to the variations in speed applied to said governor, and modified by the positioning of said power control to shift said valving for establishing automatic shift of ratio in said transmission.

36. In motor vehicles, an engine, an engine throttle pedal, a load shaft, a transmission providing changes in gear ratio between said engine and the load shaft, friction clutches for rendering said transmission operable, graduation means for regulating the action of said clutches, servo means to actuate said clutches, a member connected with said pedal, and automatic control means for selecting actuation of said clutches by said servo means according to position of said pedal and according to the speed of said shaft whereby increase of engine speed is coordinated with an influence for shift to a lower gear ratio, and decrease of engine speed as determined by release of said pedal is coordinated with an influence for shift to a higher gear ratio.

37. In motor vehicles, an engine, a throttle pedal for the engine, driving and driven shafts coupled by a variable speed ratio transmission, electrical means for selecting the speed ratio established by said transmission, automatic means controlling said electrical means responsive to fluid pressure generated proportionally to the speed of the driven shaft, and a valve effective to vary the fluid pressure operative upon said automatic means, said valve being moved by said pedal.

38. In power controls for motor vehicles, an engine, a member movable with the speed control for the engine, an input shaft, an output shaft, a gearbox coupling said shafts having friction means adapted to establish drive at a selected speed ratio between the shafts, means responsive to the torque between said shafts arranged to increase the loading of said friction means in accordance with the increase in said torque, fluid pressure servo mechanism effective to engage and disengage said friction means thereby to change speed ratio in said gear box between said shafts, and a control device influenced by motion of said member for controlling the action of said fluid pressure servo mechanism.

39. A power system including a prime mover, means for controlling the torque exerted by said prime mover, a driven member, a speed changing mechanism for connecting said driven member to said prime mover, means responsive to the speed of said driven member for changing the ratio of said speed changing mechanism, means dependent upon said torque controlling means for modifying the response of said speed responsive means, and manually operable means for connecting and disconnecting said prime mover and said driven member and for disconnecting said speed responsive control means.

40. In a motor vehicle power transmission having a plurality of fluid pressure operated speed ratio forwardly driving controlling devices, manually controlled fluid pressure distributing means for supplying fluid pressure selectively to said devices, manually operated means for selectively operating said manually controlled distributing means, and speed responsive pressure distributing means for supplying fluid pressure selectively to said controlling devices in response to speed of the motor vehicle, said speed respensive distributing means being rendered inoperative by selective operation of said manually operated means.

41. In a motor vehicle power transmission having a plurality of fluid pressure operated speed ratio controlling devices, manually controlled fluid pressure distributing means for supplying fluid pressure selectively to said controlling devices, manually operated means for selectively operating said manually controlled distributing means, and speed responsive fluid pressure distributing means for supplying fluid pressure selectively to said controlling devices in response to speed of the motor vehicle, said speed responsive distributing means being rendered inoperative in response to a plurality of selective operations of said manually operated means.

42. In a motor vehicle power transmission control system including a plurality of speed ratio controlling devices, an engine speed control manually controlled selector means for manipulating the transmission to selectively provide neutral, reverse, and any one of a plurality of forward driving speeds, a mechanism for manipulating the transmission to provide a plurality of forward driving speed ratios including a speed responsive means influenced by advancing and retarding movement of said control, and means responsive to manual setting of said selector means in providing one of said plurality of forward driving speeds for rendering said mechanism operative to manipulate the transmission to provide the remainder of said plurality of forward driving speeds.

43. In a motor vehicle power transmission control system including a plurality of speed ratio controlling devices, an engine speed control, manually controlled selector means for manipulating the transmission to provide neutral, reverse, and a plurality of forward driving speeds, a mechanism for manipulating the transmission to provide a plurality of forward driving speed ratios including a speed responsive means influenced by advancing and retarding movement of said control, means responsive to manual setting of said selector means in providing one of said plurality of forward driving speeds for rendering said mechanism operative to manipulate the transmission to provide the remainder of said plurality of forward driving speeds, and means responsive to manual setting of said selector means in providing another of said plurality of forward driving speeds for rendering said mechanism inoperative.

44. A transmission comprising a driving member, a driven member, a plurality of clutches associated with the driving member, one of which constitutes a high-speed clutch and another of which constitutes a lower speed clutch, a plurality of power trains each connecting a respective clutch with the driven member, means responsive to the speed of the driven member, a speed ratio selector element movable by said speed responsive means, means whereby the positioning of said element under low speed thereby results in automatically opening said high speed clutch, a throttle, a control for said throttle, and means connected to said control and responsive to increase in throttle positions, the last mentioned means cooperating with said speed responsive means to vary the effect of the speed responsive means to tend to cause closing of the lower speed clutch within a part of the speed range of the speed responsive means.

45. In an engine driven vehicle having a transmission provided with a plurality of speed ratio actuating devices, means responsive to predetermined increments of vehicle speed variation for selectively controlling and operating said devices, said speed responsive means including a movable selector member and yielding means acting on said member to transmit movement thereto and means for transmitting a force effective on said yielding means, and engine throttle valve adjusting means including a manually operable control element adapted to vary the effective force acting on said yielding means without loading said manually operable control element.

46. Shifting mechanism for an automobile transmission mechanism having shiftable speed changing devices adapted to transmit variable torque between power and load shafts and each including a friction clutch, comprising actuating mechanism operative upon said clutches to effect speed ratio changes, means regulating said actuating mechanism and providing a different rate of actuation of the clutch of one of said devices when actuated than of the clutch of another of said devices when actuated, speed responsive means for automatically controlling said actuating mechanism, and means operable free of the influence of the speed responsive means for manually selecting the speed changing operations of said actuating mechanism independently of said speed responsive means.

47. In motor vehicle speed ratio controls, in combination, a plurality of speed ratio driving devices embodied in a variable speed transmission and including friction clutching elements, input and output shafts coupled by said transmission, fluid motor means adapted to actuate said elements, means included in said driving elements and effective to graduate the degree of engagement of said clutching elements, governor mechanism responsive to the speed of one of said shafts and effective to select actuation of forward drive by said devices through said fluid motor means, and manual means to selectively control said fluid motor means to provide at least one forward driving speed ratio by actuation of one of said devices by said fluid motor means while definitely inhibiting the effect of said mechanism on said fluid motor means.

48. A speed change mechanism coupling driving and driven shafts, friction driving means included in said mechanism and controlling its operation, means for actuating said friction driving means, a speed responsive governor driven by rotation of one of said shafts and arranged to selectively control the actuating means, manual selector means movable to predetermined forward speed positions for independently and selectively controlling the actuating means while inhibiting the selection action of said governor, and means for graduating the degree of engagement of said friction driving means.

49. In safety controls for motor vehicles, a power shaft, a load shaft, a variable speed transmission including a plurality of ratio coupling means adapted to provide a range of driving speed ratios between said shafts, actuating means for said coupling means, means for graduating the degree of engagement of said coupling means, control mechanism for said actuating means, and ratio selection devices for said control mechanisms including a manual selector, means driven by said transmission responsive to the speed of one of said shafts and arranged to select forward speed driving ratios of said transmission, and means associating said speed responsive means with said selector whereby the selector in given positions may render said speed responsive means effective or ineffective, said associating means being so arranged that there can be no reaction upon the movement of said manual selector by said speed responsive means either when said speed responsive means is operative to select ratio or is rendered inactive to select ratio.

50. In variable speed controls, in combination, a variable speed transmission connecting driving and driven members and including selective ratio driving mechanism having friction clutching elements, a plurality of fluid pressure means arranged to actuate the driving mechanism in said transmission for establishing a range of forward step ratio drives, means included in said driving mechanism and effective to graduate the degree of engagement of said clutching elements during changes of speed ratio, a fluid pressure supply, a distributor mechanism responsive to the speed of one of said members connected to said transmission for controlling distribution from said supply to said fluid pressure means in successive ratio steps, and operator-operable means for independently controlling the distribution of the fluid pressure selectively or in successive steps at will while inhibiting distribution controlling action by said distributor mechanism.

51. In transmission mechanism for automotive vehicles, in combination, a driving and a driven member having control connections for reverse drive and neutral and a plurality of forward gear clutching connections between the driving and driven members, manual means for selecting from neutral to low drive or from neutral to reverse drive, control means including a fluid pressure system and valving, and a selector distributor subject to speed variations of one of said members for automatically and successively establishing a plurality of forward speed drives, said manual means being also selectively operable to disconnect said selector distributor from said control means to hold the drive in a manually selected speed ratio, such that fluid pressure is delivered selectively to branches of the said system irrespective of the operation of said selector distributor at times determined by operator movement of said manual means.

52. In transmission control mechanism for automotive vehicles, in combination, a step-ratio transmission coupling driving and driven members, a selector for said transmission operable manually for establishing reverse drive, neutral or forward drive, a fluid pressure system operable to sustain drive between said members in a plurality of forward speed driving ratios, means for distributing fluid pressure for said forward drive, speed responsive means driven by one of said members and arranged to control selectively the distribution of fluid pressure for said forward drive, and control means for said system operated directly by said selector for instantly disconnecting the fluid pressure distributing means from said speed responsive means at any time for releasing any existing forward drive sustaining pressure while establishing drive through the agency of said system in a forward speed ratio determined by the operation of said selector.

53. Change speed mechanism embodying driving and driven shafts, paired friction clutching devices each arranged to establish selective drive between said shafts, means effective to engage said clutching devices, means for graduating the degree of engagement of the clutching devices, a fluid pressure system embracing a fluid pressure source and fluid pressure actuating means for said devices including valve means arranged to control the flow of fluid pressure selectively to said actuating means, mechanism responsive to speed of one of said shafts and effective upon said valve means to distribute the fluid pressure to said actuating means whereby variable speed ratio drive may be obtained, and a manual control adapted to compel said valve means to distribute said fluid pressure selectively to said devices regardless of the action of said mechanism.

54. In motor vehicles, in combination, a change speed transmission embodying selective driving devices adapted to couple input and output shafts, each of which devices comprises relatively movable and engageable friction clutch members for establishing selective variable speed ratio drive, actuation means effective to actuate said members for engagement including pistons and mechanical elements as force transmitting agents acting upon said members, loading means included in said devices coacting with said members and constantly operative to load said members when engaged with a force generated by the existing torque between said shafts, and control means for said driving devices comprising valving distributing fluid pressure to said pistons selectively, the construction of the control, actuation and the loading means establishing loading of said members by said loading means to provide a ratio transition interval during which torque is temporarily supported by two of said driving devices upon engaging actuation of one of said two devices, following drive by the other of said two devices.

55. In motor vehicles, an engine, an engine speed control pedal, a power shaft, a load shaft, a variable speed transmission coupling said shafts and embodying friction elements actuatable for establishing selected speed ratio drive, power devices for actuating said elements, servo valving controlling said devices to select actuation by said devices for different speed ratios between said shafts, mechanism operative by variations in speed of said load shaft and effective to cause said servo valving to shift for increased and decreased speed ratio, a valve, means associating said valve with said mechanism, and coordinating means linking the movement of said pedal and said valve, said mechanism, valve, associating means and coordinating means being so constructed and arranged that for pedal positions of increased engine speed a retarding action against shift to a higher ratio by speed response of said mechanism is made effective.

JOHAN MACHIEL VETTER.